United States Patent [19]
Weissman

[11] 3,740,851
[45] June 26, 1973

[54] JACKETED DENTAL ANCHOR

[76] Inventor: Bernard Weissman, 340 Ashland Place, Brooklyn, N.Y. 11201

[22] Filed: Jan. 13, 1971

[21] Appl. No.: 106,152

[52] U.S. Cl. .................................................. 32/15
[51] Int. Cl. ............................................. A61k 5/02
[58] Field of Search ..................... 32/15, 13, 2, 6, 32/7, 8

[56] References Cited
UNITED STATES PATENTS
1,018,803  2/1912  Anderberg .............................. 32/15
FOREIGN PATENTS OR APPLICATIONS
841,935  5/1970  Canada ................................. 85/1 C Primary Examiner—Robert Peshock
Attorney—Friedman & Goodman

[57] ABSTRACT

A jacketed dental anchoring pin for insertion into a pre-drilled pin channel provided in the dentin of a tooth to partially project from the latter and anchor a superstructure to the tooth comprising an elastomeric or ceramic elongate hollow sleeve having opposite end portions and an intermediary threaded anchoring portion between the opposite end portions. An elongate metallic reinforcing core extends substantially throughout the entire hollow sleeve internally of the latter. One end portion of the sleeve carries a resilient element for abutting against the endmost portion of the pre-drilled pin channel in the tooth. The reinforcing core is mounted internally of the hollow sleeve in a manner which prevents both axial and rotational displacement of the core relative to the sleeve.

12 Claims, 14 Drawing Figures

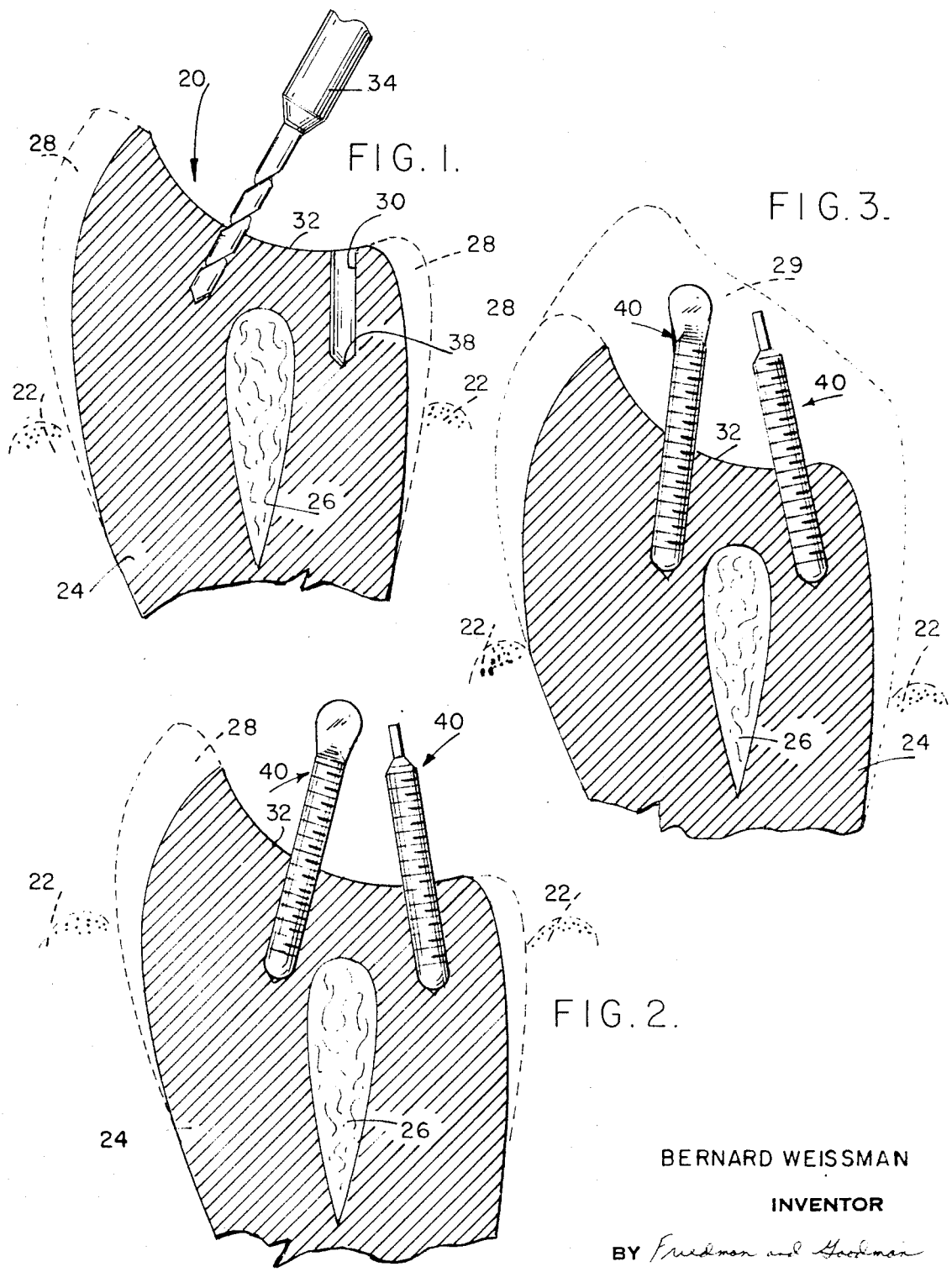

BERNARD WEISSMAN
INVENTOR

BY Friedman and Goodman
ATTORNEYS

BERNARD WEISSMAN
INVENTOR

By Friedman and Gordon
ATTORNEYS 3,740,851

JACKETED DENTAL ANCHOR

BACKGROUND OF THE INVENTION

Pins in dental work are used mainly for the retention and reinforcing of dental support structures. In this work a channel is, or a plurality of channels are, drilled in the dentin of a tooth. A dental pin is then placed into each of these channels. The dental pin is retained in the channel by conventional means, such as by screwing the pin into the channel using a self-threading pin, or by forcing the pin into friction locking engagement with the walls of the channel.

The conventional dental pins are usually provided with flat bottom portions thereof. However, the conventional twist drill which is used for excavating the channel is provided with a beveled tip and, therefore, the excavated channel is formed with a conical or beveled endmost bottom or base portion. The dental pin in the above case obviously will not seat flushly against the bottom or base portion of the channel and, therefore, the point at which the insertion of the dental pin is to be stopped is difficult to determine, such point being subject to wide variations. In these situations, stresses are produced which may cause damage to the tooth, such as causing the tooth to crack which is obviously undesirable.

SUMMARY OF THE INVENTION

Accordingly, an object of the present invention is to provide a dental pin which overcomes the disadvantages of the prior art.

Another object of this invention is to provide means whereby a dental pin may be seated within a channel provided in a tooth with the bottom of the dental pin flushly abutting against a solid tooth structure.

A further object of this invention is to provide means for completely filling the bottom or base portion of a channel formed in a tooth.

A still further object of this invention is to provide means whereby a definite stopping point for the insertion of a dental pin is indicated.

A further object of this invention is to provide means whereby the stresses produced when the incline of a channel formed in a tooth in engaged by a dental pin are evenly distributed and absorbed.

An added object of this invention is to provide a simple and easy to use dental pin which may be economically manufactured.

It is still another object of the present invention to provide a jacketed dental anchor of a color similar to that of natural dentition.

It is another object of the present invention to encapsulate a metallic core with a jacket to prevent discoloration of both the metallic core and the tooth itself which would otherwise be in contact with the metallic core.

It is still another object of the present invention to provide a metallic core, which is itself deformable, with a resilient jacket to permit partial bending or deformation of the jacketed dental anchor so as to conform to the contour of the dentition.

These objects are achieved by providing a jacketed dental anchoring pin for insertion into a pre-drilled pin channel provided in the dentin of a tooth to partially project from the latter and anchor a superstructure to the tooth comprising an elastomeric or ceramic elongate hollow sleeve having opposite end portions and an intermediary threaded anchoring portion between the opposite end portions. An elongate metallic reinforcing core extends substantially throughout the entire hollow sleeve, internally of the latter. One end portion of the sleeve carries a resilient element for abutting against the endmost portion of the pre-drilled pin channel in the tooth. The reinforcing core is mounted internally of the hollow sleeve in a manner which prevents both axial and rotational displacement of the core relative to the sleeve.

In one embodiment of the invention the sleeve is elastomeric or resilient throughout the entire extent thereof and the resilient element carried at its end portion is integrally part of the sleeve. In a further embodiment the sleeve is constituted of ceramic material which has an open and exposed inner surface into which a resilient plug is insertable, the latter constituting the resilient element as aforesaid. In each of the embodiments, the reinforcing core is metallic and terminates remote from the end portion of the hollow sleeve at which is carried the resilient element.

DESCRIPTION OF THE DRAWINGS

Having in mind the above and other objects that will be evident from an understanding of this disclosure, the invention comprises the devices, combinations and arrangements of parts as illustrated in the presently preferred embodiments of the invention which is hereinafter set forth in such detail as to enable those skilled in the art readily to understand the function, operation, construction and advantages thereof, when read in conjunction with the accompanying drawings in which:

FIG. 1 illustrates an elevational cross-sectional view of a tooth with the dentition thereof excavated prior to building a superstructure thereon and the step of providing pin channel therein pursuant to the present invention;

FIG. 2 illustrates a cross-sectional view of an excavated tooth having an exposed surface from which extends a pair of dental anchoring pins according to the present invention;

FIG. 3 illustrates a cross-sectional view similar to that of FIG. 2 of an excavated tooth upon which is mounted a superstructure through the intermediary of the anchoring pins according to the present invention;

DESCRIPTION OF THE PREFERRED EMBODIMENTS

Figure 4:
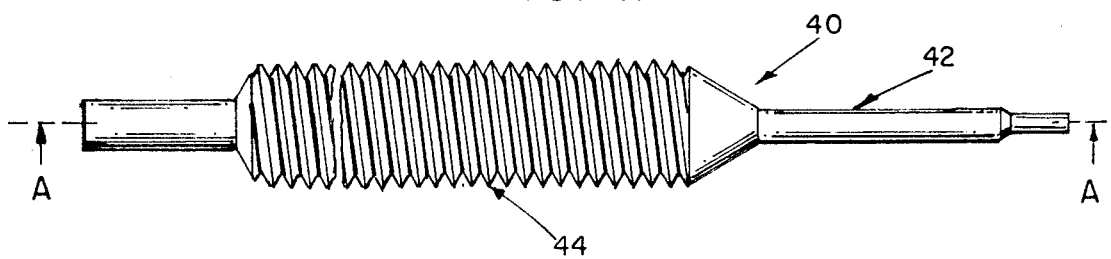
FIG. 4 illustrates a general view of the anchoring pin prior to the general last stage of manufacturing the latter.

Referring to the drawings, FIG. 1 illustrates a tooth or dentition 20 disposed in the gingiva or soft tissue 22 (shown in phantom) of the human gum. As is well known, the body 24 of the tooth 20 is formed of dentin which encloses a pulp material 26 therein. The dentin 24 which projects from the gingiva 32 into the human mouth, is covered by a layer 28 of enamel (shown in phantom). In order to prepare the dentition for building thereon, a superstructure 29, as shown in FIG. 3 in phantom, a portion of the enamel and an adjacent portion of the dentin is excavated to remove the decay and underminded tooth structure so as to provide an exposed outer excavated surface 32 with the decay removed therefrom. Any required root canal work may be accomplished at this time.

The first step pursuant to the present invention, is to provide an aperture, channel or cavity 30, or a plurality thereof, extending into the dentin 24 from the uncovered excavated surface 32, the channels 30 preferably being non-parallel. For this purpose, a conventional spiral or twist drill 34 is urged into the dentin 24, in a conventional manner, in the direction of the surface 32. The number of non-parallel channels 30 will depend upon the size and depth of the excavation. It will be noted that the various channels 30 have been drilled so as not to enter the pulp material 26, the channels 30 being directed away from the pulp material. The channels 30 thus formed have a conical bottom portion 38, as shown in the drawings.

Each of the channels 30 is to receive a reinforcing or anchor pin or rod 40. The dental pins 40 are formed preferably with a stainless steel core and a ceramic or elastomeric sleeve as will be discussed below.

As illustrated in FIG. 4, the dental anchoring pin, designed by the reference character 40, is shown in its last stage of manufacture, the manufacturing process briefly being disclosed below. The anchoring pin 40 includes a manufacturing mounting extension 42 and a threaded anchoring body 44.

Figure 5:
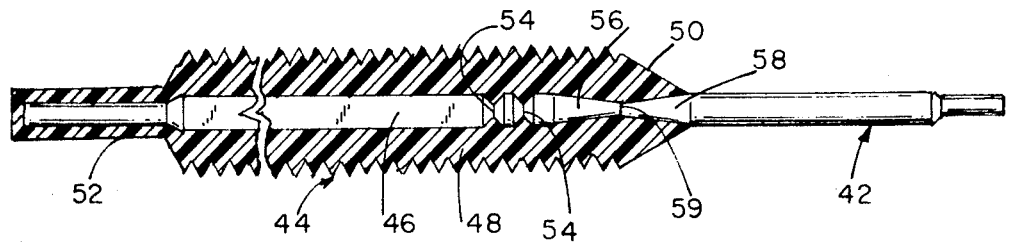
FIG. 5 illustrates a view partially in cross-section taken along the line A—A of FIG. 4.
Figure 6:
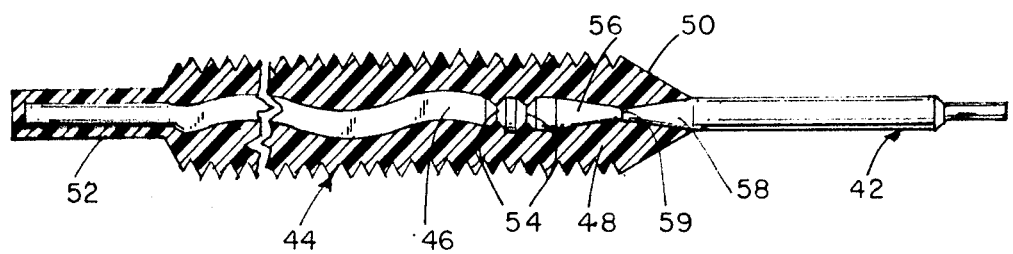
FIG. 6 illustrates a partly cross-sectional view of a further embodiment of the invention taken along the line A—A of FIG. 4.
Figure 7:
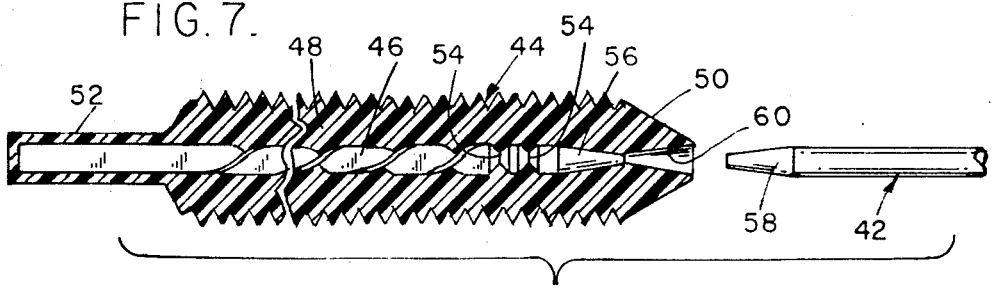
FIG. 7 illustrates generally the very last stage of manufacturing a dental pin, partly in cross-section of a further embodiment pursuant to the present invention.
Figure 8:
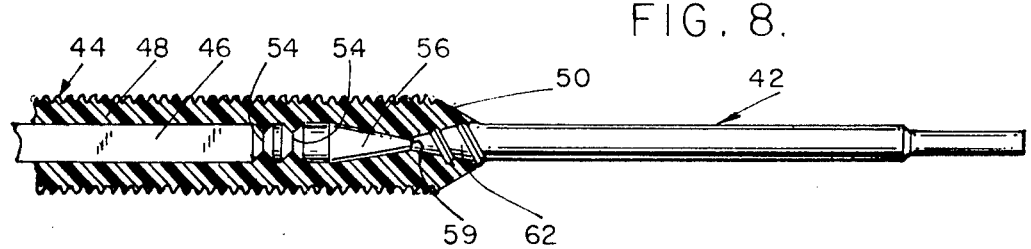
FIG. 8 illustrates partly in cross-section a further embodiment of the anchoring pin prior to the general last step of manufacturing thereof pursuant to the present invention.
Figure 9:
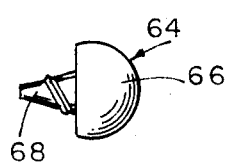
FIGS. 9 and 10 illustrate generally and in cross-section, respectively, a resilient plug utilized according to the present invention.
Figure 10:
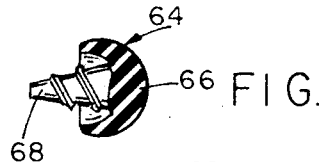
Figure 11:
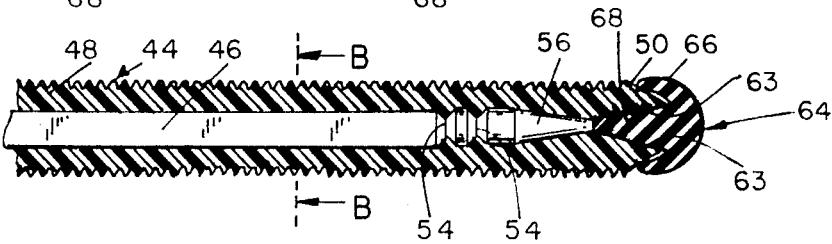
FIG. 11 illustrates, partially in cross-section, a portion of an anchoring pin and the resilient plug thereof which are adapted to extend into a pre-drill pin channel.
Figure 12:
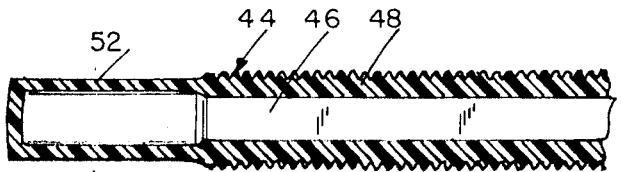
FIG. 12 illustrates the remaining portion of the anchoring pin of FIG. 11.

In the embodiments illustrated in FIGS. 5–7, the anchoring pin 40 is provided with a metallic reinforcing core 46 internally of an elastomeric or resilient hollow sleeve 48 and terminates in one end portion 50 adjoining the extension 42 and an opposite end portion or manipulating means 52 remote from the extension 42.

The metallic reinforcing core 46 is provided with a pair of successively spaced portions 54 of reduced thickness for preventing axial displacement of the core 46 relative to the sleeve 48.

The metal reinforcing core 46 terminates in a smooth conical end 56 and is integrally joined with a smooth conical end 58 of the extension 42 along a common point of minimum diameter 59, the purpose of which will be further discussed below.

When manufacturing the dental anchoring pin 40, pursuant to the present invention, the core 46 is integrally formed as part of the extension 42. Generally speaking, the extension 42 is fixedly positioned in a mounting device, not shown in the drawings, such that the core 46 is exposed to permit the disposition or molding thereabout of the hollow elastomeric sleeve 48. The hollow sleeve 48 is formed such that the end portion 50 thereof is generally conical and terminates to surround or enclose the mutually adjoining conical ends 56 and 58 of the core 46 and the extension 42 respectively. The hollow sleeve 48 is constituted generally of elastomeric material and terminates in its elastomeric conical end portion 50. As indicated above, the embodiments of FIGS. 5–7 illustrate generally the last stage of manufacturing the dental pin 40. In this respect, the last stage of manufacture is effected by rotating the extension 42 relative to the hollow sleeve 48 to thereby sever the smooth conical end 58 of the extension 42 from the conical end 56 of the core 46. Generally, when rotating the extension 42, relative to the sleeve 48, the core 46 would tend to rotate also. However, in order to prevent rotation of the core 46 relative to the sleeve 48 to permit severing of the extension 42, the core 46 is provided with an external configuration which resists rotation in the sleeve 48. In this respect, as illustrated in FIG. 5, the core 46 is shown generally as an undeformed element and may be provided with either a square cross-section or a rectangular cross-section, the sides of which act internally against the inner square or rectangular cross-section of the innermost walls of the sleeve 48 in contact with the core. Similarly in FIG. 6, there is illustrated that the core 46 may be provided with an undulating extent to enhance resistance thereof against rotation relative to the sleeve 48. Similarly also, as illustrated in FIG. 7, the core 46 may be provided with a twisted extent to enhance the resistance against rotation thereof relative to the sleeve 48.

As illustrated in FIG. 7, there is effected the condition after the last stage of manufacture of the anchoring pin 40 in that the extension 42 has been severed from the core 46 thereby leaving in the sleeve 48 a conically exposed smooth end portion 60 which envelops the common minimal diameter 59 intermediary of the extension 42 and the core 46. The common minimal diameter 59 defines the weakened-most portion and thus acts to define a predetermined severing location of the extension 42 relative to the core 46. Upon rotation of the extension 42 relative to the core 46 the extension 42 severs from the latter to leave in tact the dental anchoring pin according to the present invention with its exposed smooth opening 60.

A further embodiment of the present invention is illustrated in FIGS. 8–14, one primary difference between this latter embodiment and the former embodiment aforementioned being that in the present embodiment the extension 42 is provided with helically threaded conical end 62 integrally connected to the conical end 56 of the core 46. The other primary difference is that in the latter present embodiment of FIGS. 8–14, the hollow sleeve 48 is constituted generally of ceramic or porcelain material throughout the extent thereof.

In order to realize and effect a primary object of the present invention, the conical ceramic end 50 of the embodiments in FIGS. 8–14 must be provided with a resilient terminal abutment. This is achieved by rotating the extension 42 relative to the core 46 such that the helically threaded conical end 62 of the extension 42 severs from the conical end 56 of the core 46 at the weakened-most portion of minimal diameter 59 to leave an exposed conically threaded opening 63. A resilient or elastomeric plug 64 having a resilient abutment head 66 and a threaded conical projection 68 extending from the head 66 is threadedly seated in tight flush relation internally of the conically threaded opening 63 in the ceramic hollow sleeve 48.

Figure 13:
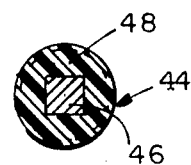
FIGS. 13 and 14 illustrate, respectively, a cross-section taken along line B—B in FIG. 11 of possible alternate cross-sections of the embodiments of the present invention.
Figure 14:
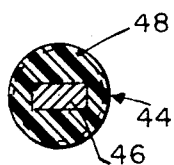

Similarly as discussed above, for the embodiments of the resilient hollow sleeve 48 in FIGS. 5–7, the cross-section of the core 46 in the embodiments of FIGS. 8–14 may be square or rectangular as illustrated in FIGS. 13–14 respectively, and may be undeformed, of undulating extent, or of twisted extent.

As discussed above, it is vitally important when inserting a dental anchoring pin into the exposed excavated surface of a tooth that there by minimal lateral and longitudinal stress exerted against the walls of the pre-drilled dental pin channels. This is vital in order to prevent immediate or gradual breakage or collapsing of the tooth. The present invention, pursuant to the embodiments illustrated, obviates this possibility by providing an anchoring pin with at least a partially resilient extent which minimizes pressure against the walls of the pre-drilled pin channels as the dental pin is threadedly deposited therein. Furthermore, the dental pin is sufficiently rigid and stable since in fact, the inner core thereof is metallic and is thus fully reinforced.

As the dental pin is threadedly seated into the pre-drilled pin channel in the tooth, the elastomeric or ceramic nature of that portion of the pin which laterally contacts the tooth is designed to be deformable before tooth deformation so as to prevent lateral breakage of the tooth. Furthermore, the end of the dental anchor, which is fully elastomeric and resilient in each of the embodiments of the present invention, contacts the lowermost excavated surface of the pre-drilled pin channel and permits tight-fastening of the pin therein since the fully resilient end deforms thus minimizing axial or longitudinal overstressing of the pin channel in the tooth.

It is noteworthy that the jacket or resilient hollow sleeve 48, whether elastomeric or ceramic, is of a color similar to that of natural dentition. Moreover, the sleeve 48, which encapsulates the metallic core 46, acts to prevent discoloration of both the metallic core 46 and the tooth dentition itself, which latter would otherwise be in contact with the core 46 in the absence of the sleeve 48.

Furthermore, in the case of the elastomeric hollow sleeve 48, which is entirely resilient, both the metallic core 46 which is itself somewhat deformably constituted and the elastomeric hollow sleeve 48 may be selectively bent together to conform to the contour of the dentition as may be necessary when anchoring the superstructure to the dentition or understructure.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A jacketed dental anchor for a tooth comprising an elongate reinforcing core, an elongate sleeve enclosing said core, said sleeve including an external intermediary anchoring portion disposed between opposite end portions of said sleeve, said elongate reinforcing core extending longitudinally through said sleeve, resilient means constituting one of said opposite end portions of said sleeve for minimizing insertion stresses resulting from said anchor, said reinforcing core including displacement resisting means disposed within said sleeve for resisting both axial and rotational displacement of said core relative to said sleeve, said displacement resisting means including a non-circular portion to resist said rotational displacement and portions of varying cross-sections to resist said axial displacement, a manipulating portion constituting the other one of said opposite end portions of said sleeve, an end portion of said core terminating in said manipulating portion, said manipulating portion encapsulating said core end portion to prevent contact between said core end portion and the tooth to avoid discoloration of both said core and the tooth, whereby said core maintains said opposite end portions of said sleeve in a fixed relationship with respect to each other so that turning said manipulating portion of said sleeve will effectively turn said one opposite end portion of said sleeve and holding said manipulating portion of said sleeve stationary will effectively hold said one opposite end portion of said sleeve stationary.

2. A dental anchor as claimed in claim 1, wherein said sleeve is elastomeric throughout the extent thereof and said resilient means is integrally part of said sleeve for constituting said one end portion of the latter.

3. A dental anchor as claimed in claim 1, wherein said sleeve is constituted of ceramic material throughout the extent thereof, said one end portion of said sleeve including an exposed internally threaded surface, said resilient means including an abutment surface for at least partially enveloping said one end portion of said sleeve and a threaded projection for insertion into and threaded association with said internally threaded surface of said one end portion of said sleeve.

4. A dental anchor as claimed in claim 1, wherein said anchoring portion of said sleeve is constituted by helically extending threads.

5. A dental anchor as claimed in claim 1, wherein said reinforcing core is constituted of metal.

6. A dental anchor as claimed in claim 5, wherein said displacement resisting means of said reinforcing core includes a body portion of square cross-section.

7. A dental anchor as claimed in claim 5, wherein said displacement resisting means of said reinforcing core includes a body portion of rectangular cross-section.

8. A dental anchor as claimed in claim 7, wherein said body portion of said displacement resisting means has a continuously twisted extent.

9. A dental anchor as claimed in claim 7, wherein said body portion of said displacement resisting means has a continuously undulating extent.

10. A dental anchor as claimed in claim 5, wherein said reinforcing core includes an intermediary extent of successively spaced portions of equal reduced thickness, and said reinforcing core includes a conical end extent axially tapering inwardly and terminating remote from said one end portion of said sleeve.

11. A dental anchor as claimed in claim 3, wherein said exposed internally threaded surface of said one end portion of said sleeve conically tapers outwardly, and said threaded projection of said resilient means conically tapers inwardly away from said abutment surface of the latter to threadedly seat flushly in said one end portion of said sleeve.

12. A dental anchor as claimed in claim 1, wherein said one opposite end portion of said sleeve is provided with an opening to allow an exposed portion of said core to extend outwardly from said sleeve, whereby the exposed portion of said core is adapted to be severed from said non-circular portion and said portions of varying cross-sections.

* * * * *